June 12, 1934.  J. B. FORD  1,962,143
SHOCK ABSORBING TIRE
Original Filed Nov. 16, 1931
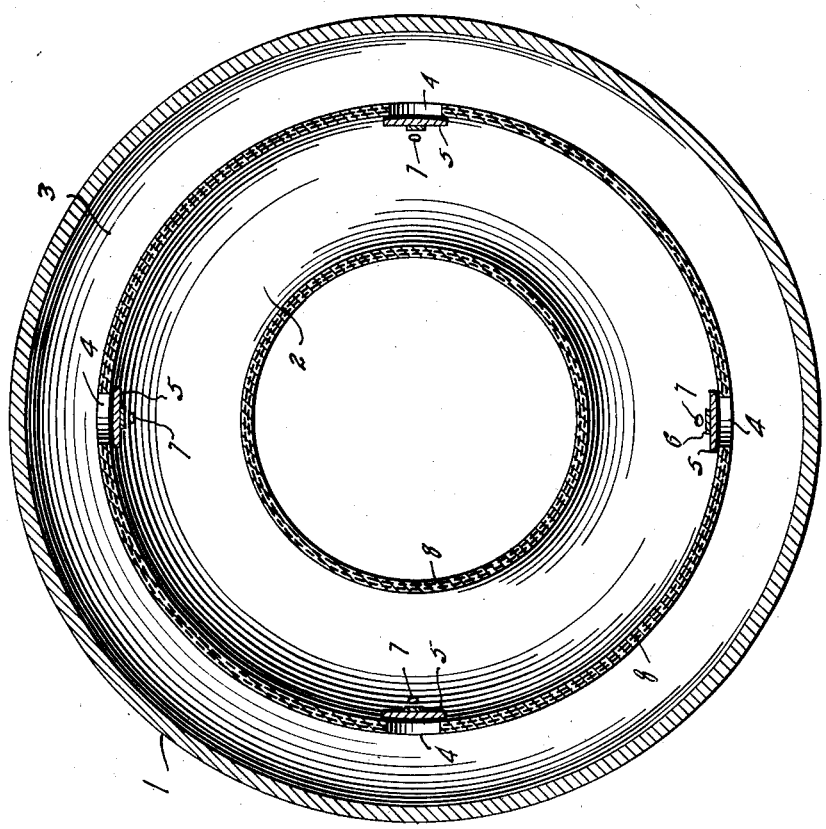
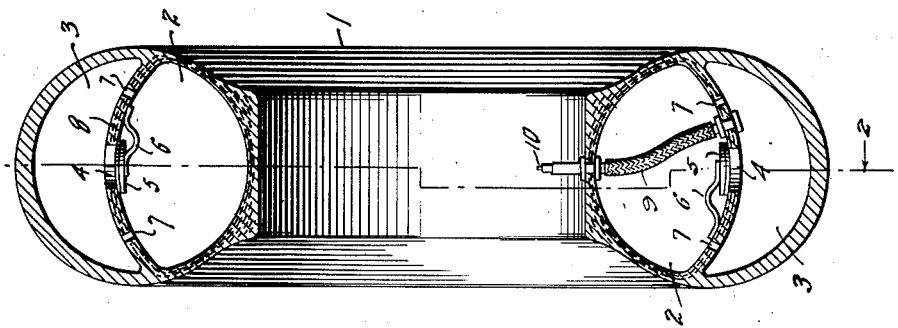
Inventor
JAMES B FORD
By R. J. Whitaker
his Attorney Patented June 12, 1934

1,962,143

UNITED STATES PATENT OFFICE 1,962,143

SHOCK ABSORBING TIRE

James B. Ford, Tulsa, Okla.

Application November 16, 1931, Serial No. 575,419
Renewed September 8, 1933

11 Claims. (Cl. 152—22)

My invention relates in general to pneumatic shock absorbers, and particularly to a pneumatic tire which has incorporated therein a shock absorber employing the principle of partial deflation and retarded re-inflation of the tire to prevent rebound after external impact. This shock absorber is adapted to any system of pneumatic support or suspension where shocks or vibration must be absorbed, and it is especially valuable when adapted to the pneumatic tires of automobiles or aircraft.

The primary function of any shock absorber is to flexibly absorb and then dissipate the energy of the impacts to which it is subjected. Flexible containers filled with air, as for example puenmatic tires, absorb the energy of impact into the confined air perfectly, but lack entirely a means of dissipating such energy once it is absorbed. The result is that the confined air which has been compressed in the flexible container by the impact immediately re-expands after the impact to its normal or a greater volume, producing what is known as rebound. This rebound is often more serious in its consequence than the original impact.

With a shock absorber of the type of my invention however, the rebound is entirely eliminated, by retarding the re-expansion of the confined air to a rate which is suitable to the effect desired. This retardation of the re-expansion of the shock absorber air and the means which I provide for accomplishing this retardation also permits the energy put into the air by the impact to be dissipated. This energy dissipation is accomplished by two simple means. The most important means is the energy degradation which accompanies a change in pressure in a gas accomplished by passing said gas from a higher pressure to a lower pressure thru a porous plug or thru the equivalent in small orifices. The second means to give the confined air time to lose to a radiator the heat which has been produced in it due to its compression from the impact. In the shock absorbing pneumatic tire described, small orifices are provided between the air chambers for energy dissipation and the walls of tire serve as the radiator to pass the heat from the confined air to the atmosphere while the air is passing thru the orifices.

The application of this shock absorbing principle to the pneumatic tires of automobiles will greatly improve their riding qualities because it eliminates entirely all unsprung weight. The unsprung weight such as the axles, wheels and tires, rebounds violently when the tires strike an obstruction on the road and the greater the unsprung weight, the more violent is the effect of the rebound on the rest of the car. To overcome this, automobiles are equipped with leaf springs which are somewhat shock absorbing due to the friction between the spring leaves, and in addition they have hydraulic or friction type shock absorbing units connected between the unsprung and the sprung parts of the car, i. e., between the axles and the frame. It would be practicable with large enough tires of the type herein disclosed to eliminate entirely from automobiles all suspension springs and their accessory shock absorbers, and still have a good riding car. However, such a car could be still further improved by providing between the axles and the frame a suitably shaped shock absorbing air container of this type which would completely replace the present spring and shock absorber type of suspension. Such an automobile would be far quieter on the road, would have the very finest riding qualities over all types of roads, would require practically no maintenance of the running gear, and should be cheaper to manufacture.

For aircraft this tire has equal advantages. It eliminates the heavy oleo or pneumatic shock absorbing struts now in use, and permits building the landing gear as a fixed and rigid structure instead of an articulated structure. This will reduce the weight and also the maintenance of the landing gear, and actually the shock absorbing qualities will be improved.

In the following disclosure of my invention, which describes a pneumatic tire, it must be understood that the principle involved is not restricted to the specific design of the tire illustrated or to pneumatic tires in general, but may be applied to any cushioning or shock absorbing device by changing the size and shape of the several parts incorporated therein to adapt themselves to their several needs.

In the drawing, in which like characters of reference are employed to designate like parts:

Figure 1 is a lateral cross sectional view of my shock absorbing pneumatic tire; and, Figure 2 is a sectional view on line 2—2 of Figure 1.

In illustrating my invention a pneumatic tire 1 is used as an example and comprises an inner annular compartment 2 and another annular compartment 3 concentric with the inner compartment 2. A plurality of ports 4 connecting the two compartments are normally held closed by valves 5 actuated by springs 6. Additional orifices or vents 7 are also provided between the compartments 2 and 3. These vents 7 are of relatively small size and are not provided with closures.

The compartment 3 may be constructed of rubber or other flexible and expansible material capable of making this compartment collapsible. The inner compartment is flexible but non-expansible and is constructed to maintain at all times substantially the same volumetric capacity by means of intermolded fabric, cord, metal or other suitable material 8. It is immaterial to the spirit of my invention or the basic idea involved whether the two compartments 2 and 3 are constructed as one unit or whether the non-expansible compartment be a separate unit of entirely unconventional construction either within or remote from the elastic compartment.

A tube 9 provided with a conventional check valve 10 is provided in the compartment 3 for initially inflating the tire.

In operation the tire is inflated to its proper capacity or pressure which will depend on the load carried or the purpose to which it is employed. If used as a unit of an airplane wheel, it will be seen, that upon landing, the impact of the tire with the ground, the flexible outer casing will be collapsed an appreciable amount, the normal compressibility of the air in the tire acting as a cushion. The air in the compartment 3 flows through the ports 4 due to this impact and the collapse of compartment 3, into the inner non-expansible chamber 2 being trapped therein by means of the one way valves 5. The increased pressure in the inner chamber 2 must return to its normal pressure but can only do so slowly and at a predetermined rate thru the restricted vents 7. These vents being small, the return of air to the outer compartment is retarded and the return of the outer compartment to its original size is relatively slow. In a pneumatic tire of conventional structure the increased pressure in the tire caused by impact returns to normal pressure at a very rapid rate causing a rebound to the vehicle which it carries, creating a severe strain on all its parts. In my shock absorbing pneumatic device however, this rapid return to normal pressure and its consequent rebound is entirely eliminated due to the retarded passage of air thru the relatively small vents 7.

As stated above it is within the spirit of my invention and within the scope of the appended claims that I may construct the device in any shape or size or arrangement of its several parts as required by the use to which the device is to be put.

Having thus described my invention, what I claim is:

1. A pneumatic tire, means to initially inflat the tire, and means entirely within the tire dividing the same into chambers, said means being formed integral with walls of the tire and serving to control flow of air from one chamber into the other.

2. A pneumatic tire, means therein to prevent rebound after impact, said means being an integral part of the air chamber of the tire and molded of the same material as the air chamber.

3. A pneumatic tire having inner and outer concentric chambers, means to permit partial deflation of the outer chamber of the tire upon impact and retard reinflation of the outer chamber, said means being an integral part of the tire and located entirely within the same between the tread and rim engaging portions of the tire.

4. A pneumatic tire comprising a flexible air chamber divided by an integral flexible partition into two compartments, one of which is expansible and the other non-expansible, ports in the partition connecting the two compartments, valves in the ports permitting rapid passage of air from the expansible compartment to the non-expansible compartment, orifices in the partition permitting the relatively slow return of the air from the non-expansible compartment to the expansible compartment.

5. A shock absorbing tire comprising a hollow body having a tread and side walls, and a partition in said body joined to the side walls intermediate the tread and rim and defining inner and outer annular chambers, walls of the outer chamber being expansible and walls of the inner chamber non-expansible means being associated with said partition to permit free movement of air from the outer compartment into the inner compartment when the tire is subjected to blows and retard return of the air into the outer compartment after impact to prevent rebound.

6. A shock absorbing tire comprising a hollow annular body defining an annular air chamber, and means in said body intermediate the depth thereof united to side walls of the body and defining inner and outer compartments, means being associated with the last mentioned means to control movement of air from one compartment into the other and prevent rebound after impact.

7. A pneumatic tire comprising a flexible body divided into inner and outer annular chambers by an integral partition, one of said chambers having expansible walls and the other non-expansible walls, means being provided in the partition and entirely within the body to permit rapid passage of air from the expansible chamber into the non-expansible chamber and slow return of air into the expansible chamber to prevent rebound after impact.

8. A pneumatic tire comprising a flexible body divided into two compartments by an integral flexible partition of the same material as the body, one of said compartments having expansible walls and the other non-expansible walls, ports having self closing check valves being provided in the partition for rapid passage of air from the expansible compartment into the non-expansible compartment, the partition being also provided with relatively small unobstructed openings for slow return of air from the non-expansible compartment to prevent rebound after impact.

9. A pneumatic tire comprising an annular flexible body divided by an integral flexible partition into inner and outer annular chambers one of which has expansible walls and the other non-expansible walls, ports in said partition establishing communication between the two chambers, valves for said ports permitting rapid passage of air from the expansible chamber into the non-expansible chamber, perforations being formed in the partition to permit relatively slow return of air into the expansible chamber and prevent rebound after impact.

10. A pneumatic shock absorber comprising an annular hollow body of flexible material, a circumferentially extending partition of flexible material in said body disposed transversely therein between side walls of the body and being integrally united to the side walls and defining inner and outer concentric chambers, the partition and walls of the inner chamber being non-elastic and walls of the outer chamber elastic, said partition having air ports formed therein to permit rapid movement of air from the outer chamber into the inner chamber controlled by inwardly opening check valves and the partition having means associated therewith to permit slow return of air from the inner chamber into the outer chamber.

11. A pneumatic shock absorber comprising an annular hollow body, a partition extending circumferentially in said body and integrally joined to side walls thereof to define inner and outer concentric chambers, portions of the body forming walls for the outer chamber formed of flexible elastic material and the portions of the body forming walls for the inner chamber being of flexible non-elastic material, said partition being formed with openings for passage of air from the outer chamber into the inner chamber when the walls of the outer chamber are collapsed by a blow delivered thereon, and inwardly opening valves carried by said partition and yieldably held in closing relation to inner ends of the openings, smaller openings being formed in the partition for return of air from the inner compartment and prevent rebound after impact.

JAMES B. FORD.